US010044074B2

(12) United States Patent
Rigby et al.

(10) Patent No.: US 10,044,074 B2
(45) Date of Patent: Aug. 7, 2018

(54) BATTERY POWER SOURCE CONTROL AND CURRENT DETECTION SYSTEMS AND METHODS

(75) Inventors: Craig W. Rigby, Bayside, WI (US); Thomas J. Dougherty, Waukesha, WI (US); Chih Yu Chen, Mission Viejo, CA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 1185 days.

(21) Appl. No.: 13/420,464

(22) Filed: Mar. 14, 2012

(65) Prior Publication Data
US 2012/0235483 A1    Sep. 20, 2012

Related U.S. Application Data (60) Provisional application No. 61/454,448, filed on Mar. 18, 2011.

(51) Int. Cl.
| | | |
|---|---|---|
| *H02J 7/00* | (2006.01) | |
| *H01M 10/48* | (2006.01) | |
| *H01M 10/633* | (2014.01) | |

(52) U.S. Cl.
CPC ....... *H01M 10/482* (2013.01); *H01M 10/486* (2013.01); *H01M 10/633* (2015.04); *Y10T 307/391* (2015.04)

(58) Field of Classification Search
CPC .......................... G01R 31/3658; H01M 6/5038
USPC ......................................................... 320/112
See application file for complete search history.

(56) References Cited

U.S. PATENT DOCUMENTS

| | | | | |
|---|---|---|---|---|
| 5,894,212 A | * | 4/1999 | Balogh ................. | H02J 7/0026 320/116 |
| 6,549,014 B1 | * | 4/2003 | Kutkut ................... | G01R 1/203 320/132 |
| 2003/0087147 A1 | * | 5/2003 | Minamiura ........ | G01R 31/3658 429/61 |
| 2005/0038614 A1 | | 2/2005 | Botts et al. | |
| 2005/0077878 A1 | | 4/2005 | Carrier et al. | |
| 2005/0269994 A1 | * | 12/2005 | Ishishita ............. | H01M 10/613 320/150 |
| 2007/0024245 A1 | * | 2/2007 | Zhu ....................... | H02J 7/1423 320/150 |

(Continued)

OTHER PUBLICATIONS

Partial International Search (Annex to form PCT/ISA/206) for PCT No. PCT/US2012/029179 dated Jun. 26, 2012; 2 pages.

*Primary Examiner* — Richard Isla Rodas
*Assistant Examiner* — Johali Torres Ruiz
(74) *Attorney, Agent, or Firm* — Fletcher Yoder, P.C.

(57) ABSTRACT

Provided battery systems include a plurality of battery electronic control units, each associated with a battery pack of a plurality of battery packs. Each battery electronic control unit is adapted to acquire analog current measurements of the associated battery pack and to convert the acquired analog current measurements to a digital value such that the plurality of battery electronic control units produce a plurality of digital values. The system may sum the digital values, or may process pulse-width modulated signals, analog signals and so forth. A battery system electronic control unit is adapted to receive and monitor the plurality of digital values and to determine a total battery system current value based on the received plurality of digital values.

19 Claims, 7 Drawing Sheets

(56) References Cited

U.S. PATENT DOCUMENTS

| | | | |
|---|---|---|---|
| 2007/0090803 A1* | 4/2007 | Yun | B60L 3/0046 |
| | | | 320/128 |
| 2007/0239374 A1 | 10/2007 | Dougherty et al. | |
| 2009/0208815 A1 | 8/2009 | Dougherty et al. | |
| 2010/0052614 A1* | 3/2010 | Mariels | H02J 7/0016 |
| | | | 320/116 |
| 2010/0079146 A1 | 4/2010 | Kurose et al. | |
| 2010/0173180 A1 | 7/2010 | Li | |
| 2010/0185405 A1 | 7/2010 | Aoshima et al. | |
| 2010/0301807 A1* | 12/2010 | Gamboa | H01M 2/0245 |
| | | | 320/118 |

* cited by examiner

FIG. 8 ions may be more susceptible to variations in battery temperature than comparable NiMH batteries, and thus, systems may be used to regulate the temperatures of the lithium-ion batteries during vehicle operation. The manufacture of lithium-ion batteries also presents challenges unique to this battery chemistry, and new methods and systems are being developed to address such challenges. Accordingly, it would be desirable to provide an improved battery module and/or system for use in electric vehicles that addresses one or more challenges associated with NiMH and/or lithium-ion battery systems used in such vehicles.

BATTERY POWER SOURCE CONTROL AND CURRENT DETECTION SYSTEMS AND METHODS

CROSS REFERENCE TO RELATED APPLICATIONS

This application claims priority from and the benefit of U.S. Provisional Application Ser. No. 61/454,448, entitled "Battery Power Source Device and Current Detection Method Therefor", filed Mar. 18, 2011, which is hereby incorporated by reference.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles"), may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, such as in certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. That is, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batter-

SUMMARY

In one embodiment, a battery system includes a plurality of battery packs. The system also includes a plurality of battery electronic control units, each associated with a battery pack of the plurality of battery packs. Each battery electronic control unit is adapted to acquire analog current measurements of the associated battery pack and to convert the acquired analog current measurements to a digital value such that the plurality of battery electronic control units produce a plurality of digital values. The system also includes a battery system electronic control unit adapted to receive and monitor the plurality of digital values, to control a sample speed at which the plurality of battery electronic control units sample the acquired analog current measurements, and to determine a total battery system current value based on the received plurality of digital values.

In another embodiment, a battery monitoring method includes receiving a plurality of digital values from a plurality of battery electronic control units, each associated with a battery pack of a plurality of battery packs. Each of the digital values corresponds to an analog current measurement of a battery pack of the plurality of battery packs. The method also includes monitoring the plurality of digital values and determining, based on the plurality of digital values, a sample speed at which the plurality of battery electronic control units sample the acquired analog current measurements. The method also includes controlling the plurality of battery electronic control units to sample the analog current measurements at the determined sample speed.

In another embodiment, a battery system includes a plurality of slave electronic control units, each associated with a battery pack of a plurality of battery packs and adapted to monitor and control the associated battery pack. The system also includes a master electronic control unit associated with a master battery pack of the plurality of battery packs and coupled to each of the plurality of slave electronic control units. The master electronic control unit is adapted to determine, based on a received system control signal, a subset of the plurality of slave electronic control units that are not to receive power, and to selectively electronically decouple the subset of the plurality of slave electronic control units from the master electronic control unit.

In another embodiment, a battery system includes a plurality of battery electronic control units, each associated with a battery pack of a plurality of battery packs. Each battery electronic control unit is adapted to acquire analog current measurements of the associated battery pack and to convert the acquired analog current measurements to a digital value such that the plurality of battery electronic control units produce a plurality of digital values. The system also includes a battery system electronic control unit adapted to receive and monitor the plurality of digital values and to determine a total battery system current value based on the received plurality of digital values.

DETAILED DESCRIPTION

Figure 1:
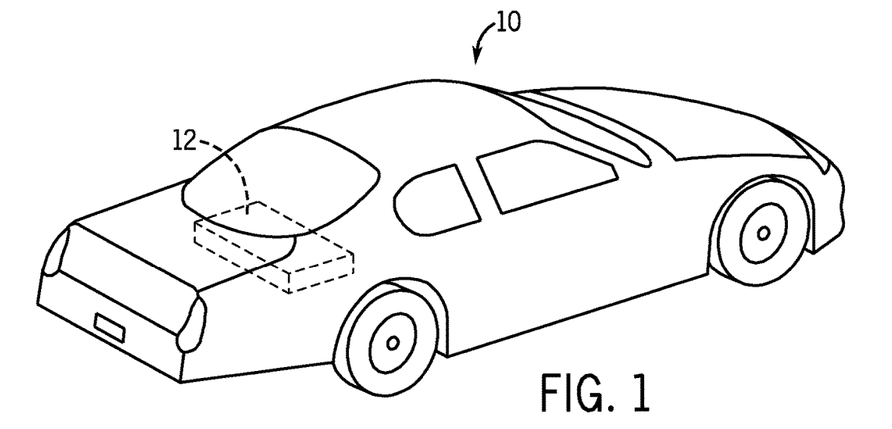
FIG. 1 is perspective view of an embodiment of a vehicle having a battery module or system for providing all or a portion of the motive power for the vehicle.

Turning now to the drawings, FIG. 1 is a perspective view of a vehicle 10 in the form of an automobile (e.g., a car) having a battery module or system 12 for providing all or a portion of the motive power for the vehicle 10. In some embodiments, the vehicle 10 may be an electric vehicle (EV), a hybrid electric vehicle (HEV), a plug-in hybrid electric vehicle (PHEV), or any other type of vehicle using electric power for propulsion (collectively referred to as "electric vehicles"). Additionally, although illustrated as a car in FIG. 1, the type of the vehicle 10 may be implementation-specific, and, accordingly, may differ in other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Further, although the battery module 12 is illustrated in FIG. 1 as being positioned in the trunk or rear of the vehicle 10, according to other exemplary embodiments, the location of the battery module 12 may differ. For example, the position of the battery module 12 may be selected based on the available space within the vehicle 10, the desired weight balance of the vehicle 10, the location of other components used with the battery system (e.g., battery management systems, vents or cooling devices, etc.), and a variety of other implementation-specific considerations.

Figure 2:
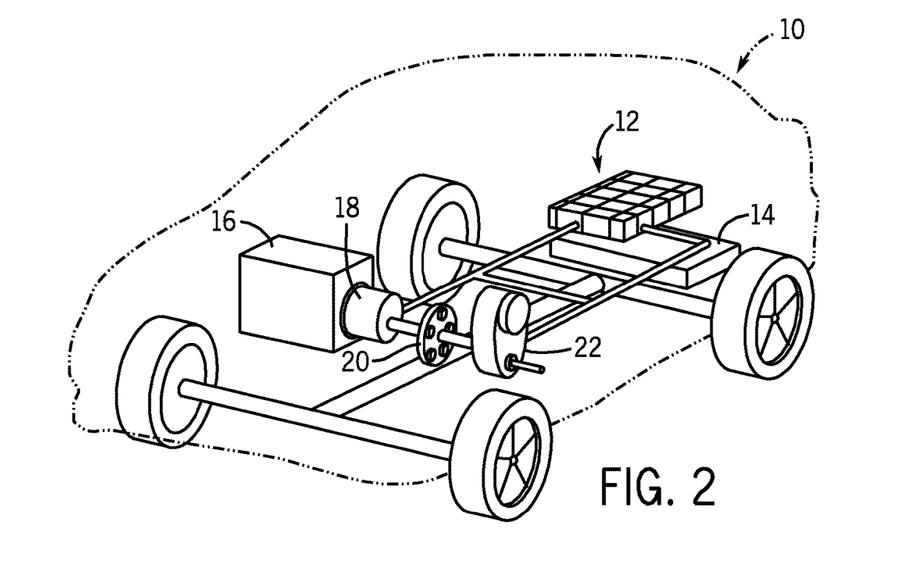
FIG. 2 illustrates a cutaway schematic view of an embodiment of the vehicle of FIG. 1 provided in the form of a hybrid electric vehicle.

FIG. 2 illustrates a cutaway schematic view of the vehicle 10 provided in the form of an HEV according to a presently disclosed embodiment. In the illustrated embodiment, the battery module or system 12 is provided toward the rear of the vehicle 10 proximate a fuel tank 14. However, in other embodiments, the battery module 12 may be provided immediately adjacent the fuel tank 14 or may be provided in a separate compartment in the rear of the vehicle 10 (e.g., a trunk) or may be provided elsewhere in the vehicle 10. An internal combustion engine 16 is provided for times when the HEV utilizes gasoline power to propel the vehicle 10. An electric motor 18, a power split device 20, and a generator 22 are also provided as part of the vehicle drive system. Such an HEV may be powered or driven by just the battery system 12, by just the engine 16, or by both the battery system 12 and the engine 16. It should be noted that other types of vehicles and configurations for the vehicle electrical system may be used according to other embodiments, and that the schematic illustration of FIG. 2 should not be considered to limit the scope of the subject matter described in the present application. Indeed, according to various other embodiments, the size, shape, and location of the battery module or system 12, the type of vehicle 10, the type of vehicle technology (e.g., EV, HEV, PHEV, etc.), and the battery chemistry, among other features, may differ from those shown or described.

According to an embodiment, the battery module or system 12 is responsible for packaging or containing electrochemical cells or batteries, connecting the electrochemical cells to each other and/or to other components of the vehicle electrical system, and regulating the electrochemical cells and other features of the battery system 12. For example, the battery module or system 12 may include features that are responsible for monitoring and controlling the electrical performance of the system, managing the thermal behavior of the system, containment and/or routing of effluent (e.g., gases that may be vented from a battery cell), and other aspects of the battery module or system.

Figure 3:
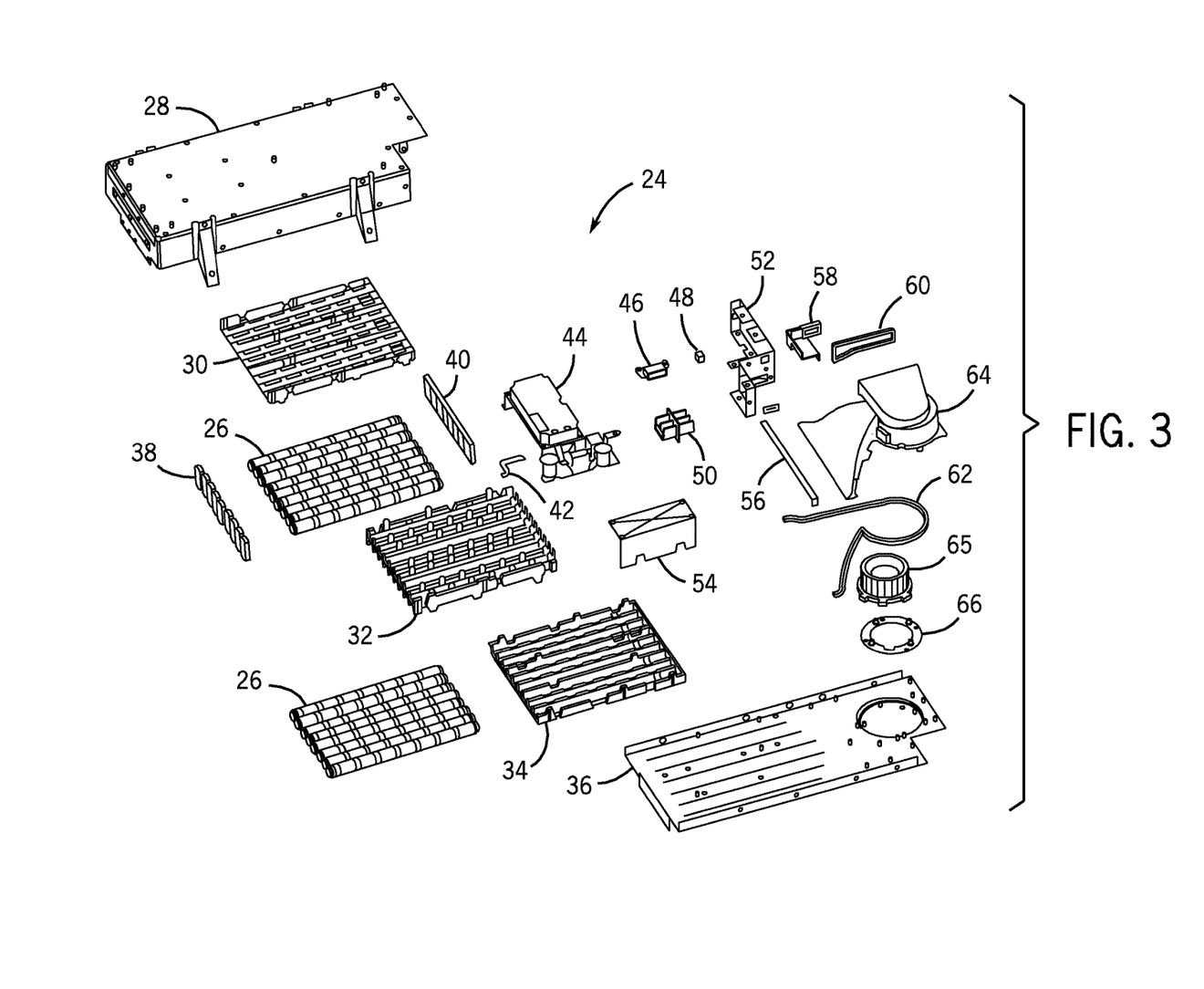
FIG. 3 illustrates an isometric view of a battery pack in accordance with a presently disclosed embodiment.

Referring to FIG. 3, an isometric view of a portion of a battery module or battery pack 24 is shown according to a presently disclosed embodiment. The illustrated battery module 24 includes a plurality of electrochemical cells or batteries 26 (e.g., lithium-ion cells, nickel-metal-hydride cells, lithium polymer cells, etc., or other types of electrochemical cells now known or hereafter developed). According to one embodiment, the electrochemical cells 26 are generally prismatic lithium-ion cells configured to store an electrical charge. According to other embodiments, the cells may have other physical configurations (e.g., oval, cylindrical, polygonal, etc.). Further, the capacity, size, design, and other features of the cells 26 may also differ from those shown according to other exemplary embodiments.

Although illustrated in FIG. 3 as having a particular number of electrochemical cells, it should be noted that according to other exemplary embodiments, a different number and/or arrangement of electrochemical cells may be used depending on any of a variety of implementation-specific considerations (e.g., the desired power for the battery system, the available space within which the battery module must fit, etc.).

According to one embodiment, the battery module 24 includes a housing having, for example, a cover assembly 28, a top tray 30, a center tray 32, a bottom tray 34, and a base plate 36. One or more components of the housing may be made of a polymeric material or any other suitable material (e.g., electrically insulative materials). The housing and/or partitions may also include features to provide spacing of the cells away from the surface of the housing and/or from adjacent cells. The cover 28 may be provided to partially or completely surround or enclose the cells.

Additionally, the battery module may include a variety of other implementation-specific components that couple the electrochemical cells 30 together with the housing, provide cooling capabilities, provide sealing capabilities, and so forth. For example, in the illustrated embodiment, each of the cells 26 are electrically coupled to one or more other cells or other components of the battery system using connectors provided in the form of bus bars or similar elements. To that end, the module 24 includes a bus bar assembly 38, a bus bar container 40, and a bus bar 42. The module 24 also includes a battery disconnect unit assembly 44, a molex connector 46, an interlock connector 48, a high voltage connector 50, an end cap assembly 52, an electronics shield 54, a seal 56, a safety cover 58, seals 60 and 62, a duct 64, a fan 65, and a fan ring 66.

While FIG. 3 illustrates one embodiment of the battery module 24, it should be understood that the battery module 12 is not limited to any particular arrangement, as will be appreciated by those skilled in the art. For instance, while the battery module shown in FIG. 3 is shown with horizontally oriented cells arranged back to back in two banks or groups by parallel frame members, it should be understood that the battery module may have many different configurations. For example, the cells may also be generally vertical, be several separate groups, or arranged in other configurations. Furthermore, different numbers and types (e.g., nickel-metal-hydride, etc.) of cells may be used. Further, the housing may include features (e.g., sidewalls, etc.) that are intended to receive and arrange the cells.

Figure 4:
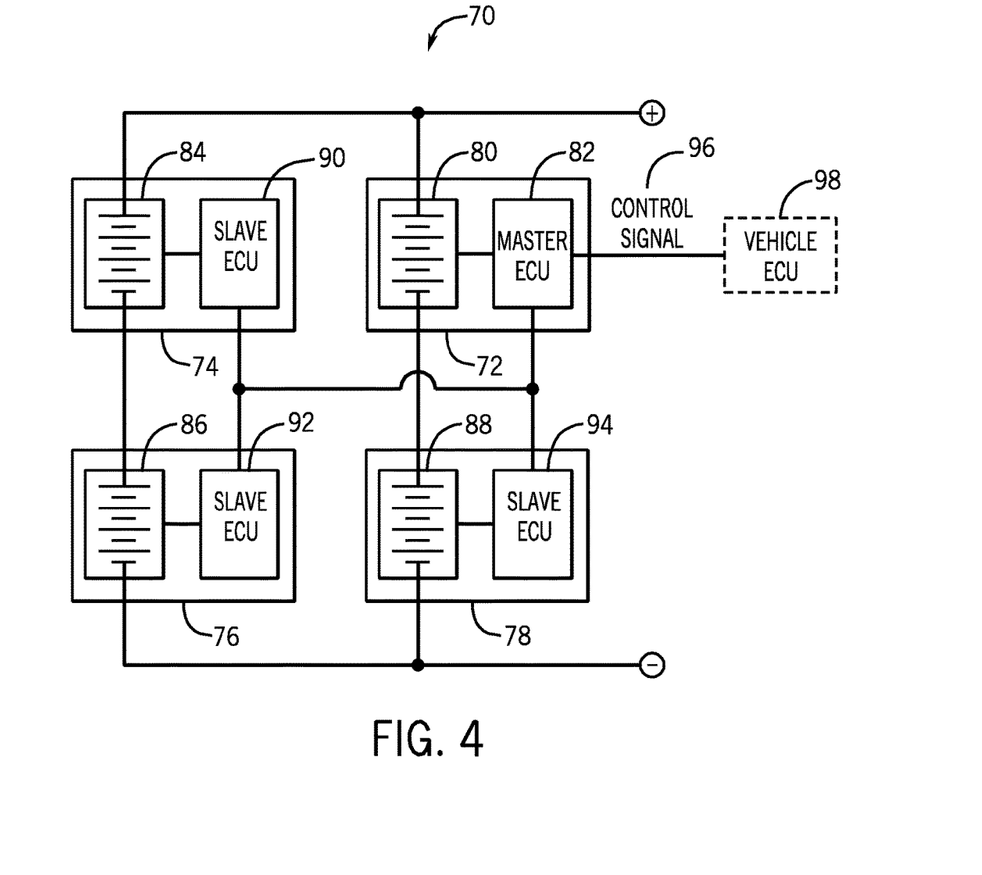
FIG. 4 is a block diagram illustrating an embodiment of a battery control system including a master electronic control unit coupled to a vehicle electronic control unit and a plurality of slave electronic control units.

FIG. 4 illustrates an embodiment of a battery control system 70. The battery control system 70 may include multiple batteries or battery packs that are electronically coupled in series and in parallel. For example, in the illustrated embodiment, the battery control system includes batteries 72, 74, 76, and 78. It is noted that each battery may include one or more cells or one or more battery modules. Specifically, in the illustrated embodiment, the master battery 72 includes a battery pack 80 and a master electronic control unit (ECU) 82. Similarly, the slave batteries 74, 76, and 78 include battery packs 84, 86, and 88 and slave ECUs 90, 92, and 94, respectively.

As shown, each battery pack 80, 84, 86, and 88 is controlled by the associated ECU 82, 90, 92, and 94. Each ECU is configured to monitor the operating state or any abnormalities of the associated battery, for example, by sensing voltage, current, and/or temperature of the battery. Each ECU may also control a cooling system for the respective battery (e.g., a fan) based on a sensed temperature, calculate a state of charge (SOC) of the battery based on sensed voltage and/or current, control charging of the battery, etc.

According to one embodiment, each ECU is powered by an external power source (i.e., not the battery it monitors/controls). However, according to other embodiments, each ECU may be powered by the battery it monitors/controls. According to various embodiments, the ECUs may include any circuitry capable of monitoring and/or controlling the respective battery, for example, a processing circuit, an application specific integrated circuit (ASIC), a programmable logic array (PLA), analog circuitry, etc.

As shown, the ECU 82 of a first of the batteries may be the master ECU configured to control the other ECUs or slave ECUs. The master ECU 82 may determine whether the slave ECUs receive power or not based on a received control signal 96, for example, from a vehicle ECU 98 adapted to control power output of the battery system and an engine system. If the master ECU 82 determines (e.g., based on the control signal 96 from the vehicle ECU 98) that the slave ECUs 90, 92, 94 should be turned off or should remain off (e.g., to conserve power), the master ECU 82 provides a control signal to a switch to electronically decouple the slave ECUs 90, 92, 94 from the master ECU 82. If the master ECU 82 determines (e.g., based on the control signal 96 from the vehicle ECU 98) that the slave ECU s 90, 92, 94 should be turned on or should remain on, the master ECU 82 provides a control signal to a switch to electronically couple the slave ECUs 90, 92, 94 from the master ECU 82. It is noted that according to various embodiments, the switch may be any electronic device capable of electronically coupling or decoupling based on a received signal, for example, one or more transistors, one or more logic gates, an analog switch, etc.

In some embodiments, the master ECU 82 may also control or determine data or control signals sent to the slave ECUs 90, 92, 94 based either on the control signal 96 from the vehicle ECU 98 or from independent calculations, for example to alert the slave ECUs 90, 92, 94 about how much power the battery should provide. In such cases, the master ECU 82 may also selectively provide data or control signals to the slave ECUs 90, 92, 94 depending on whether power is provided to the slave ECUs 90, 92, 94.

Figure 5:
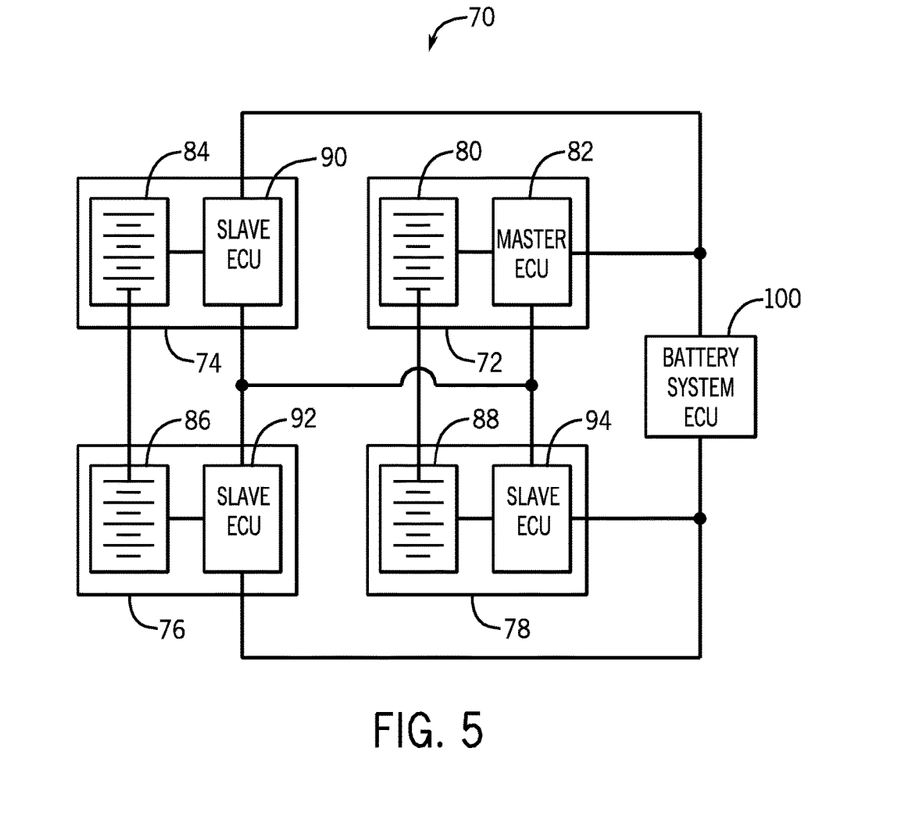
FIG. 5 is a block diagram illustrating an embodiment of a battery control system including a master electronic control unit, a plurality of slave electronic control units, and a battery system electronic control unit.

FIG. 5 illustrates additional details of the battery control system 70 of FIG. 4 according to a presently disclosed embodiment. In the illustrated embodiment, the battery control system 70 additionally includes a battery system ECU 100 (e.g., a master computer) that is configured to monitor the battery packs together as a group and/or provide additional data to each battery ECU. The battery system ECU 100 may be configured to receive and monitor current measurements of each battery pack taken by each battery ECU. The current measurements may be performed based on a sample speed or clock signal generated by the battery system ECU 100. If the current measurement of an individual battery pack is greatly higher than other battery packs, the battery system ECU 100 may direct the respective battery ECU to provide greater cooling to the battery or the battery system ECU may balance loads of each battery. If the current measurements have a large variance over time, the battery system ECU 100 may speed up the sampling speed or clock rate provided to the battery ECUs. Likewise, if the current measurements have a little to no variance over time, the battery system ECU 100 may slow down the sampling speed or clock rate provided to the battery ECUs. The battery system ECU 100 may determine the state of charge (SOC) of the battery system based on a summation of the battery pack current values. The battery system ECU 100 may also compare the total current of the battery system to the current through a known resistance, such as an engine shunt. For example, if the current of the battery system is greater, there may be a short in the battery system, and if the current of the battery system is less, there may be current leakage in the battery system.

Figure 6:
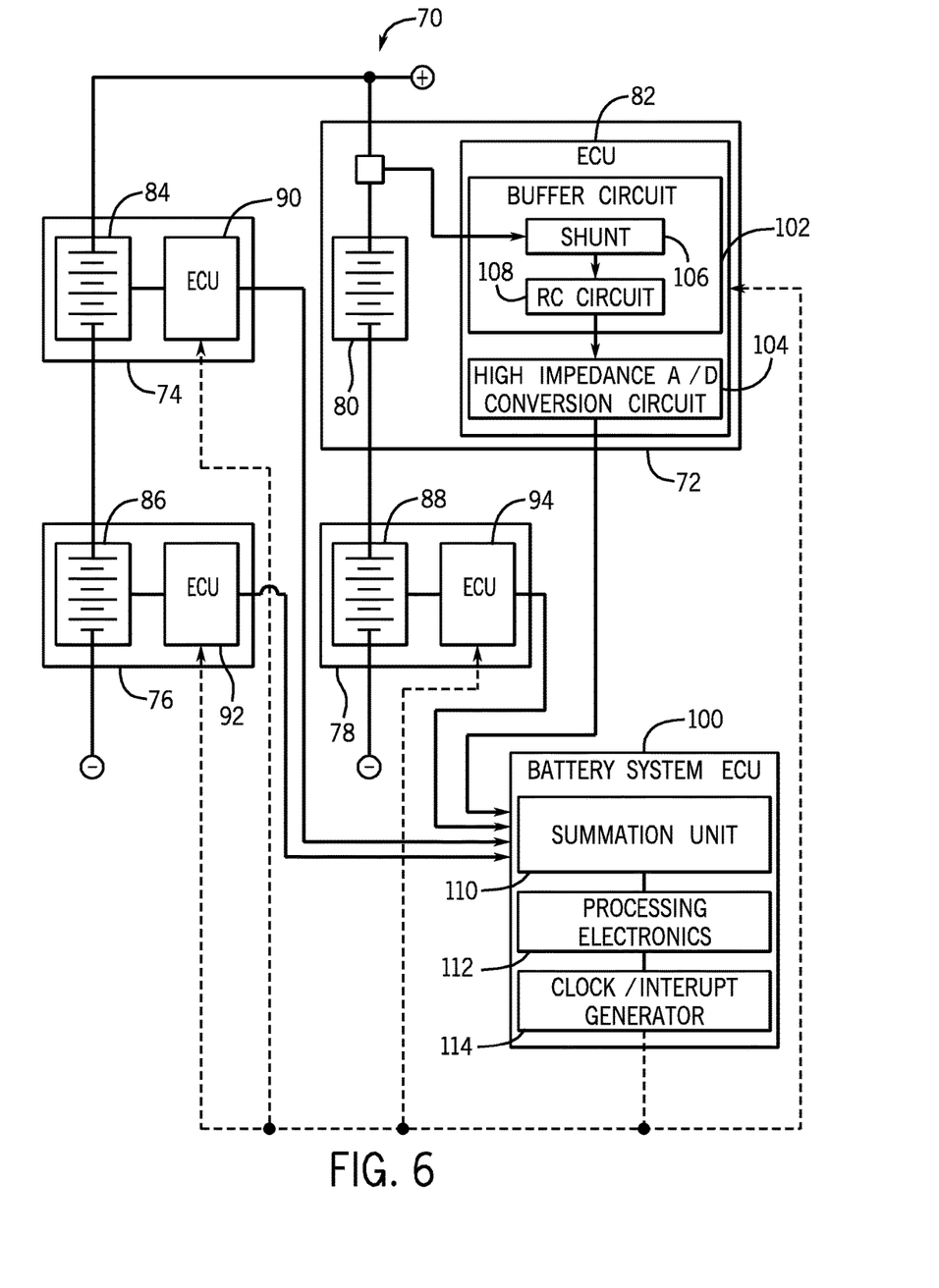
FIG. 6 is a block diagram illustrating internal components of a battery electronic control unit and a battery system electronic control unit in accordance with a presently disclosed embodiment.

Referring to FIG. 6, further details of the battery control system 70 of FIGS. 4 and 5 are illustrated according to a presently disclosed embodiment. One of the battery ECUs 82 is illustrated to include a buffer circuit 102 and an analog to digital (A/D) conversion circuit 104. It is noted that for simplicity only one of the ECUs is illustrated as including the buffer and A/D conversion circuits 102 and 104, however, each ECU may include the buffer and A/D conversion circuits 102 and 104.

The buffer circuit 102 may be configured to take analog measurements of the current through the associated battery pack. Additionally, the buffer circuit 102 may act as a capacitive filter to filter out noise from the current measurements. The buffer circuit 102 includes a shunt 106 configured to draw current into the ECU 82 and an RC circuit 108 configured to measure the current over time. The RC circuit 108 may have a time constant that is great enough to differ from the sample speed (e.g., a clock pulse, pulse-width modulation, etc.) of the battery system ECU 100 so that the RC circuit 108 may obtain an accurate current measurement over time for each sample requested by the battery system ECU 100. For example, the time constant may be twice the sample speed, three times the sample speed, five times the sample speed, or greater. The RC circuit 108 receives the sample speed from the battery system ECU 100 for tuning the time constant of the RC circuit 108.

The A/D conversion circuit 104 (e.g., a high impedance A/D conversion circuit) is configured to convert the analog current measurements taken by the RC circuit 108 into digital values for use by the battery system ECU 100. The A/D conversion circuit 104 may convert the analog values into digital values based on the sample speed received from the battery system ECU 100. In one embodiment, the A/D conversion circuit 104 may only convert the analog current measurements to digital values when the circuit receives a signal from the battery system ECU 100. The A/D conversion circuit may then provide a digital representation of the analog current value to the battery system ECU 100.

The battery system ECU 100 is configured to receive digital representations of the current measurements made by each battery ECU. According to one embodiment, the battery system ECU 100 includes a summation circuit 110, processing electronics 112, and a clock generator 114. The clock generator 114 is configured to generate the sample speed at which the battery ECUs sample or convert digital current values from the analog current measurements. In some embodiments, the clock generator 114 may generate a periodic clock signal for transmission to the battery ECUs. In other embodiments, the clock generator 114 may provide a sample signal to the battery ECUs via pulse-width modulation or another signal generation technique. In still other embodiments, the clock generator 114 may generate and provide an interrupt based on signals received from the processing electronics 112. If the processing electronics 112 detects a vehicle event that may warrant a current measurement, it may direct generation of an interrupt. For example, a vehicle event that would cause a current inrush (e.g., from initial breaking of a circuit, from initial coupling to a large capacitive load, etc.) may prompt generation of an interrupt.

The summation unit 110 is configured to receive the digital values corresponding to the current measurements taken by respective RC circuits 108 for each set of battery packs in series. The summation circuit 110 adds the values of the current measurements together to generate a total current value. The summation unit 110 only needs a current value from one battery ECU in each set of battery packs that is coupled in series. In some embodiments, the summation unit 110 may average current values received over time from each set of battery packs before adding the values together. The total current may then be used by the processing electronics 112 to perform other operations. It should be noted that, although in the presently contemplated embodiment, current measurements are converted to digital values for summing, other signal types and may also be used. For example, the summations may be based on pulse-width modulated signals, analog signals (e.g., modified analog signals or 20 ma signals) and so forth.

The processing electronics 112 are configured to perform various operations based on current measurements taken by the battery ECUs. The processing electronics 112 may receive current measurements from each individual battery pack ECU. The processing electronics 112 may control the sample speed of the clock generator 114 and may direct the master ECU 82 or any slave ECU 90, 92, 94 to perform various operations. If the current measurement of an individual battery pack is greatly higher than other battery packs, the processing electronics 112 may direct the respective battery ECU to provide greater cooling to the battery or the processing electronics 112 may balance loads of each battery. If the current measurements have a large variance over time, the processing electronics 112 may speed up the sampling speed or clock rate generated by the clock generator 114 and provided to the battery ECUs. Likewise, if the current measurements have little to no variance over time, the processing electronics 112 may slow down the sampling speed or clock rate provided to the battery ECUs. The processing electronics 112 may determine the SOC of the battery system based on a summation of the battery pack current values. The processing electronics 112 may also compare the total current of the battery system to the current through a known resistance, such as an engine shunt. For example, if the current of the battery system is greater than the current through the engine shunt, there may be a short in the battery system. If the current of the battery system is less than the current through the engine shunt, there may be current leakage in the battery system.

It should be noted that while the embodiments of FIGS. 4-6 illustrate a series of two battery packs coupled in parallel with another series of two battery packs, in other embodiments, any number of battery packs may be coupled in series, in parallel, or in any combination of series and parallel.

Figure 7:
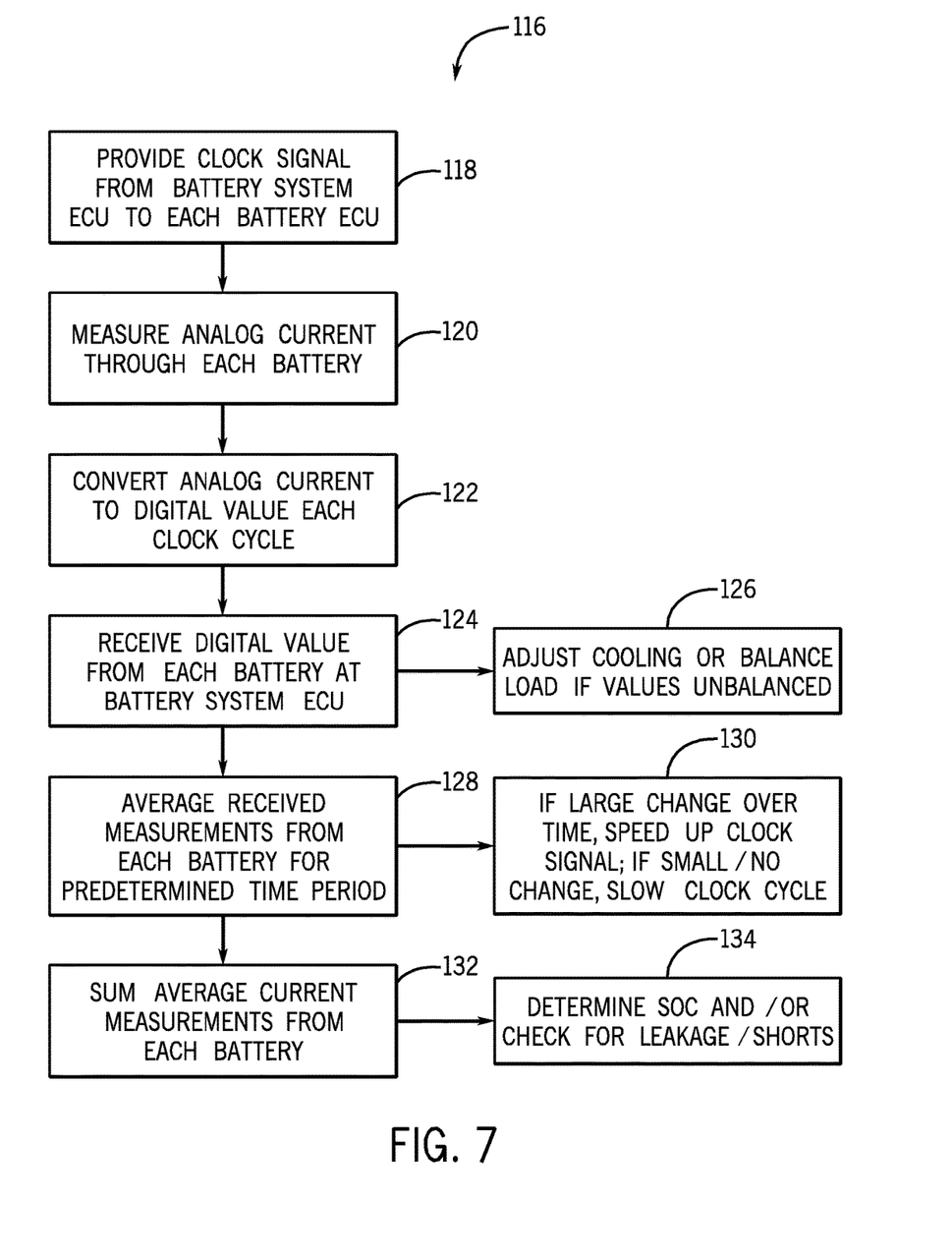
FIG. 7 illustrates an embodiment of a method for monitoring current values of a battery system.

Referring to FIG. 7, a method 116 for monitoring current values of a battery system is illustrated according to an embodiment. The battery system ECU provides a clock signal or sample speed to each battery ECU (block 118). The battery ECUs may then measure analog current flow through each battery (block 120) and, based on the sample speed or clock signal, the battery ECU may convert the analog current measurement into a digital value for transmission to the battery system ECU (block 122). The battery system ECU may then receive digital values from each battery ECU corresponding to the analog current measurements (block 124). The battery system ECU may determine whether the current values from one or more battery ECUs are unbalanced or greatly different from the values from other battery ECUs. If the values are unbalanced, the battery system ECU may direct the corresponding battery ECU(s) to provide greater cooling or the battery system ECU may balance the battery system loads (block 126).

The battery system ECU may also average the received measurements from each battery ECU over a predetermined time period (block 128). If the battery system ECU identifies a large current change over time, it may speed up the sample speed, and if the battery system ECU identifies little to no current change over time, it may slow down the sample speed (block 130). The battery system ECU may sum or add the averaged current values from each set of series battery ECUs (block 132). The battery system ECU may then determine the SOC of the battery system based on a summation of the battery pack current values (block 134).

The battery system ECU may also compare the total current of the battery system to the current through an engine shunt. For example, if the current of the battery system is greater than the current through the engine shunt, there may be a short in the battery system. If the current of the battery system is less than the current through the engine shunt, there may be current leakage in the battery system. If a short or leakage exist, the battery system ECU may alert the engine ECU, may attempt to identify the problem, or may provide an alert to the user or to maintenance personnel.

Figure 8:
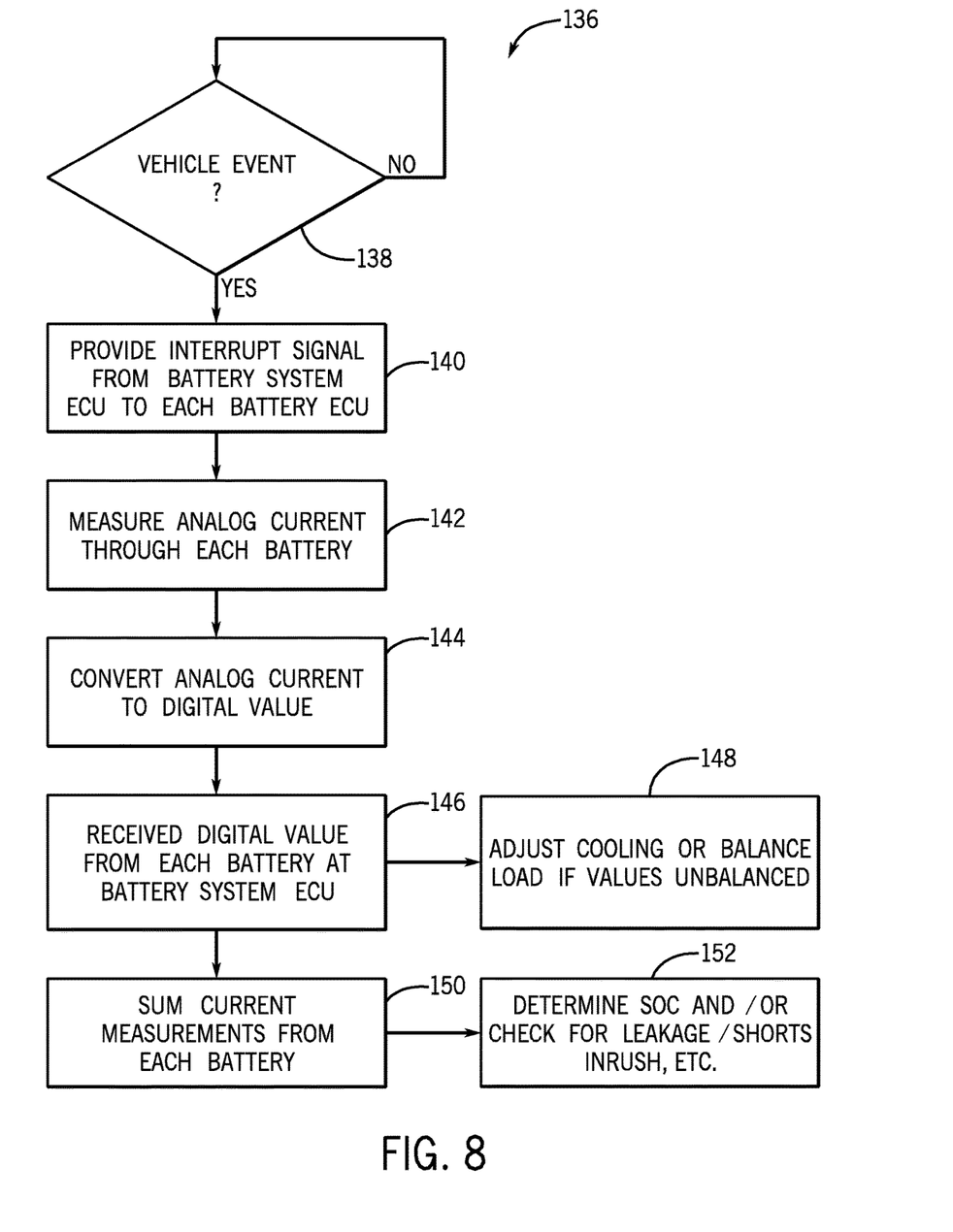
FIG. 8 illustrates an embodiment of a method suitable for measuring current values of a battery system due to a vehicle event.

Referring to FIG. 8, a method 136 for measuring current values of a battery system due to a vehicle event is illustrated according to a presently disclosed embodiment. In addition to or instead of the method of FIG. 7, current measurements may be useful for certain vehicle events such as those causing current inrushes to the battery. If such a vehicle event is detected by the processing electronics (block 138), the battery system ECU provides an interrupt to each battery ECU (block 140). The battery ECUs may then measure analog current flow through each battery (block 142). Based on the interrupt, the battery ECU may convert the analog current measurement into a digital value for transmission to the battery system ECU (block 144). The battery system ECU may then receive digital values from each battery ECU corresponding to the analog current measurements (block 146). The battery system ECU may determine whether the current values from one or more battery ECUs are unbalanced or greatly different from the values from other battery ECUs. If the values are unbalanced, the battery system ECU may direct the corresponding battery ECU(s) to provide greater cooling or the battery system ECU may balance the battery system loads (block 148). The battery system ECU may sum or add the current values from each set of series battery ECUs (block 150). The battery system ECU may then determine the SOC of the battery system or check for leakage current or short circuits as described above (block 152). The battery system ECU may also determine if there is a large current inrush (e.g., due to the vehicle event), which may prompt action by the system to counteract the large current and avoid or reduce damage to the battery system. For example, the battery system may be disconnected, a large resistance may be introduced into the system, a problematic load may be disconnected, etc.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the systems and method disclosed herein as shown in the various embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. A battery system, comprising:
a plurality of battery packs;
a plurality of battery electronic control units, each associated with a battery pack of the plurality of battery packs, wherein each battery electronic control unit is configured to acquire analog current measurements of the associated battery pack and to convert the acquired analog current measurements to digital values such that the plurality of battery electronic control units produce a plurality of digital values; and
a battery system electronic control unit configured to:
receive and monitor the plurality of digital values;
control a sample speed at which the plurality of battery electronic control units sample the analog current measurements based on a variance of the analog current measurements associated with each battery pack of the plurality of battery packs;
determine a total battery system current value based on the plurality of digital values; and
control cooling of a first battery pack of the plurality of battery packs in response to a first analog current measurement associated with the first battery pack being greater than a second analog current measurement associated with a second battery pack of the plurality of battery packs.

2. The battery system of claim 1, wherein each of the plurality of battery electronic control units is further configured to control a cooling system for the associated battery pack based on a sensed temperature of the associated battery pack.

3. The battery system of claim 1, wherein each of the plurality of battery electronic control units is further configured to calculate a state of charge of the associated battery pack based on a measured current or voltage of the associated battery pack.

4. The battery system of claim 1, wherein each of the plurality of battery electronic control units comprises a processing circuit, an application specific integrated circuit, a programmable logic array, or a combination thereof.

5. The battery system of claim 1, wherein each of the plurality of battery electronic control units comprises a buffer circuit configured to acquire the analog current measurements through the associated battery pack and to filter noise from the acquired analog current measurements.

6. The battery system of claim 5, wherein the buffer circuit comprises a shunt configured to draw current into the battery system electronic control unit and a resistor-capacitor circuit configured to measure the current over time.

7. The battery system of claim 1, wherein the battery system electronic control unit comprises a clock generator configured to generate the sample speed at which the plurality of battery electronic units sample the acquired analog current measurements.

8. The battery system of claim 7, wherein the clock generator is further configured to generate a second sample speed at which the plurality of battery electronic control units convert the acquired analog current measurements into the digital values.

9. The battery system of claim 1, wherein the battery system electronic control unit comprises a summation unit configured to receive the plurality of digital values and to sum the plurality of digital values to determine the total battery system current value.

10. A battery monitoring method, comprising:
receiving a respective set of digital values from each of a plurality of battery electronic control units, wherein the respective set of digital values from each of the plurality of battery control units is associated with a respective battery pack of a plurality of battery packs, wherein each respective set of the digital values corresponds to a plurality of analog current measurements of the respective battery pack of the plurality of battery packs;
controlling each of the plurality of battery electronic control units to sample the respective plurality of analog current measurements at a respective sample speed at which a respective battery electronic control unit of the plurality of battery electronic control units samples the respective plurality of analog current measurements;
adjusting the respective sample speed for the respective battery electronic control units based on a change of the respective plurality of analog current measurements;
determining when a first analog current measurement of a first battery pack of the plurality of battery packs is different than a second analog current measurement of a second battery pack of the plurality of battery packs; and
controlling the respective battery electronic control unit associated with the first battery pack to increase cooling of the first battery pack based on a difference between the first analog current measurement and the second analog current measurement.

11. The method of claim 10, wherein adjusting the respective sample speed comprises decreasing the respective sample speed when the change between the respective plurality of analog current measurements is less than a threshold.

12. The method of claim 10, wherein adjusting the respective sample speed comprises increasing the respective sample speed when the change between the respective plurality of analog current measurements exceeds a threshold.

13. The method of claim 10, comprising determining a total battery system current value based on a summation of each respective set of digital values.

14. The method of claim 13, comprising determining a state of charge of a battery system comprising the plurality of battery packs based on the total battery system current value.

15. A battery system, comprising:
a plurality of battery electronic control units, each associated with a battery pack of a plurality of battery packs, wherein each battery electronic control unit is configured to acquire analog current measurements of the associated battery pack and to convert the acquired analog current measurements to digital values such that the plurality of battery electronic control units produce a plurality of digital values; and
a battery system electronic control unit configured to:
receive and monitor the plurality of digital values and to determine a total battery system current value based on the received plurality of digital values;
control a sample speed at which each of the plurality of battery electronic control units sample the analog current measurements of the associated battery pack based on a variance between the analog current measurements; and
control cooling of a first battery pack of the plurality of battery packs in response to a first analog current measurement associated with the first battery pack being greater than a second analog current measurement associated with a second battery pack of the plurality of battery packs.

16. The system of claim 15, wherein the battery system electronic control unit comprises a clock generator configured to generate the sample speed at which each of the plurality of battery electronic units sample the analog current measurements.

17. The system of claim 15, wherein each of the plurality of battery electronic control units comprises a buffer circuit configured to configured to acquire the analog current measurements through the associated battery pack.

18. The system of claim 17, wherein the buffer circuit comprises a shunt configured to draw current into the battery electronic control unit and a resistor-capacitor circuit configured to measure the current over time.

19. The system of claim 15, wherein each of the plurality of battery electronic control units comprises a processing circuit, an application specific integrated circuit, a programmable logic array, or a combination thereof.

\* \* \* \* \*

UNITED STATES PATENT AND TRADEMARK OFFICE
CERTIFICATE OF CORRECTION

PATENT NO. : 10,044,074 B2
APPLICATION NO. : 13/420464
DATED : August 7, 2018
INVENTOR(S) : Rigby et al.

Page 1 of 1

It is certified that error appears in the above-identified patent and that said Letters Patent is hereby corrected as shown below:

In the Drawings

Fig. 6, Drawing Sheet 5 of 7, for Tag "114", Line 1, delete "CLOCK/INTERUPT" and insert -- CLOCK/INTERRUPT --, therefor.

Fig. 7, Drawing Sheet 6 of 7, for Tag "130", Line 4, delete "CLOCK CYCLE" and insert -- CLOCK SIGNAL --, therefor.

In the Specification

Column 2, Line 63, delete "DRAWINGS" and insert -- BRIEF DESCRIPTION OF THE DRAWINGS --, therefor.

Column 2, Line 65, delete "is perspective" and insert -- is a perspective --, therefor.

Column 4, Line 54, delete "cover 28" and insert -- cover assembly 28 --, therefor.

Column 4, Line 58, delete "electrochemical cells 30" and insert -- electrochemical cells 26 --, therefor.

Signed and Sealed this
Sixth Day of November, 2018

Andrei Iancu
*Director of the United States Patent and Trademark Office*